(12) United States Patent
Tremelling et al.

(10) Patent No.: US 10,634,188 B2
(45) Date of Patent: Apr. 28, 2020

(54) ROTORS FOR ROTATING MACHINES WITH HOLLOW FIBER-REINFORCED COMPOSITE SHAFT

(71) Applicant: ABB Research Ltd, Zurich (CH)

(72) Inventors: Darren Dale Tremelling, Cary, NC (US); Dezheng Wu, Shanghai (CN); Steven Carl Englebretson, Raleigh, NC (US); Simon E. Mushi, San Diego, CA (US); Se Young Yoon, Dover, NH (US); Yujing Liu, Ojersjo (SE)

(73) Assignee: ABB Schweiz AG, Baden (CH)

( * ) Notice: Subject to any disclaimer, the term of this patent is extended or adjusted under 35 U.S.C. 154(b) by 90 days.

(21) Appl. No.: 15/994,341

(22) Filed: May 31, 2018

(65) Prior Publication Data

US 2018/0274589 A1    Sep. 27, 2018

Related U.S. Application Data

(62) Division of application No. 14/432,206, filed as application No. PCT/US2013/059826 on Sep. 13, 2013, now Pat. No. 10,012,263.

(Continued)

(51) Int. Cl.
*H02K 1/28* (2006.01)
*H02K 7/00* (2006.01)
(Continued)

(52) U.S. Cl.
CPC .......... *F16C 32/0493* (2013.01); *F16C 3/026* (2013.01); *F16C 32/047* (2013.01);
(Continued)

(58) Field of Classification Search
CPC .. F16C 32/0493; F16C 32/048; F16C 32/047; F16C 32/0474; F16C 3/026;
(Continued)

(56) References Cited

U.S. PATENT DOCUMENTS 3,623,220 A   11/1971   Chase et al.
4,028,573 A    6/1977   Terrone
(Continued)

FOREIGN PATENT DOCUMENTS

EP    0577409    1/1994
EP    0707753    9/1997
(Continued)

OTHER PUBLICATIONS

Lapierre et al, FR 2829311 A1, IDS, English translation, printed on Feb. 19, 2020 (Year: 2020).*

(Continued)

*Primary Examiner* — John K Kim
(74) *Attorney, Agent, or Firm* — Taft Stettinius & Hollister LLP; J. Bruce Schelkopf

(57) ABSTRACT

Rotating machines and rotors therefor are disclosed. The bearings may be magnetic bearings configured to magnetically levitate the rotor. The rotors may include a hollow fiber-reinforced composite shaft and a magnetic bearing rotor core disposed on the shaft and configured for use with the magnetic bearing. In some examples, the rotating machines may be electrical machines.

20 Claims, 2 Drawing Sheets

Related U.S. Application Data

(60) Provisional application No. 61/707,015, filed on Sep. 28, 2012.

(51) Int. Cl.
    *H02K 7/09*     (2006.01)
    *F16C 32/04*     (2006.01)
    *F16C 3/02*     (2006.01)

(52) U.S. Cl.
    CPC ........ *F16C 32/048* (2013.01); *F16C 32/0474* (2013.01); *H02K 7/003* (2013.01); *H02K 7/09* (2013.01); *F16C 2240/40* (2013.01); *F16C 2240/60* (2013.01); *F16C 2240/70* (2013.01); *F16C 2380/26* (2013.01); *H02K 1/28* (2013.01)

(58) Field of Classification Search
    CPC .............. F16C 2240/70; F16C 2240/40; F16C 2240/60; F16C 2380/26; H02K 7/003; H02K 7/09; H02K 1/28
    USPC .................................................. 310/89, 90.5
    See application file for complete search history.

(56) References Cited

U.S. PATENT DOCUMENTS

| | | | |
|---|---|---|---|
| 5,614,777 A * | 3/1997 | Bitterly | F16F 15/30 310/74 |
| 5,851,152 A | 12/1998 | Hzhofer et al. | |
| 6,104,115 A | 8/2000 | Offringa et al. | |
| 6,194,852 B1 | 2/2001 | Lovatt et al. | |
| 6,504,274 B2 | 1/2003 | Bunker et al. | |
| 6,831,385 B2 | 12/2004 | Hasegawa et al. | |
| 7,042,118 B2 | 5/2006 | McMullen et al. | |
| 7,228,615 B2 | 6/2007 | Nilson | |
| 7,323,509 B2 | 1/2008 | Van Dine | |
| 10,012,263 B2 * | 7/2018 | Tremelling | F16C 32/047 |
| 2002/0135249 A1 | 9/2002 | Canders et al. | |
| 2003/0184176 A1 | 10/2003 | Steinmeyer | |
| 2011/0062806 A1 | 3/2011 | Ohashi et al. | |
| 2013/0181560 A1 | 7/2013 | Galmiche | |
| 2015/0084464 A1 * | 3/2015 | Ramdane | H02K 1/2726 310/90.5 |
| 2015/0275966 A1 * | 10/2015 | Tremelling | H02K 7/09 310/90.5 |
| 2015/0280523 A1 * | 10/2015 | Tremelling | H02K 9/19 310/59 |
| 2016/0036294 A1 * | 2/2016 | Vande Sande | F16C 32/048 310/90.5 |
| 2018/0274589 A1 * | 9/2018 | Tremelling | H02K 7/09 |

FOREIGN PATENT DOCUMENTS

| | | |
|---|---|---|
| EP | 0903835 | 3/1999 |
| FR | 2829311 | 12/2003 |
| JP | 60091008 | 5/1985 |

OTHER PUBLICATIONS

Buckner, G.B. et al. "Control System for Inside-Out Configuration Magnetic Bearings", 5th Int. Sypm. on Magentic Suspension Technology, as early as Jan. 1, 2001, 12 pgs.

Hawkins. L. et al., "Shock and Vibration Testing of an AMB Supported Energy Storage Flywheel", 8th Int. Symp. on Magnetic Bearings, Aug. 26, 2002, 6 pgs.

Magnetic Bearing, available at http://en.wikipedia.org/wiki/magnetic_bearing, Sep. 5, 2012, 5 pgs.

International Search Report and Written Opinion, PCT Appln. No. PCT/US13/059826, dated Feb. 24, 2015, 14 pgs.

\* cited by examiner

ROTORS FOR ROTATING MACHINES WITH HOLLOW FIBER-REINFORCED COMPOSITE SHAFT

CROSS REFERENCE TO RELATED APPLICATION(S)

The present application is a divisional of U.S. patent application Ser. No. 14/432,206 filed Mar. 28, 2015, which is a 35 USC § 371 national stage application of PCT Application No. PCT/US13/59826 filed Sep. 13, 2013, which claims the benefit of U.S. Provisional Patent Application Ser. No. 61/707,015, filed on Sep. 28, 2012. The complete disclosure of the above-identified patent applications are hereby incorporated by reference for all purposes.

FIELD OF THE DISCLOSURE

The present disclosure relates to rotating machines, and more particularly to rotors for rotating machines having composite shafts.

BACKGROUND

Rotating machines often include rotors or shafts that are fabricated from steel forgings. However, large rotating machines, including large electrical machines, require a correspondingly large rotor and shaft, which would require a large steel forging. Such large steel forgings are expensive to forge and machine, heavy to transport, and offer limited flexibility in design of the machine. Furthermore, when solid forged steel rotors or rotor shafts are used with electrical machines, the bearings typically must be placed outside or beyond the end windings of the machine, which increases the length of the rotor and lowers its lateral critical speed.

Examples of rotating machine rotors are disclosed in U.S. Pat. Nos. 4,028,573 and 6,452,301; in International Publication Nos. WO2007/110282 and WO2011/012131; and in Japanese published patent application JP2006-158008A. Examples of composite shafts, armatures and tubes are disclosed in U.S. Pat. Nos. 3,623,220; 5,851,152; 6,072,252; 7,323,509 and 7,617,582; and in European Patent Application Publication No. 577409A1. Examples of magnetic bearings are disclosed in U.S. Pat. Nos. 3,787,100; 4,763,032 and 6,831,385. The disclosures of these and all other publications referenced herein are incorporated by reference in their entirety for all purposes.

SUMMARY

In some examples, rotors for use with rotating machines that have magnetic bearings may include a hollow fiber-reinforced composite shaft with a magnetic bearing rotor core disposed on the shaft and configured for use with the magnetic bearing. The magnetic bearings may be configured to magnetically levitate the rotor.

In some examples, electrical machine rotors may include a hollow fiber-reinforced composite shaft having an interior surface, a rotor active portion disposed within the shaft, and a magnetic bearing rotor core disposed on the shaft. The rotor active portion may extend around the interior surface. The magnetic bearing rotor core may be configured for use with a magnetic bearing.

In some examples, electrical machines may include a stator, a rotor and a bearing. The rotor may extend through the stator and may include a hollow fiber-reinforced composite shaft and a rotor active portion. The rotor active portion may be disposed within the hollow fiber-reinforced composite shaft. The bearing may be configured to support the shaft for rotation relative to the stator.

DETAILED DESCRIPTION

Figure 1:
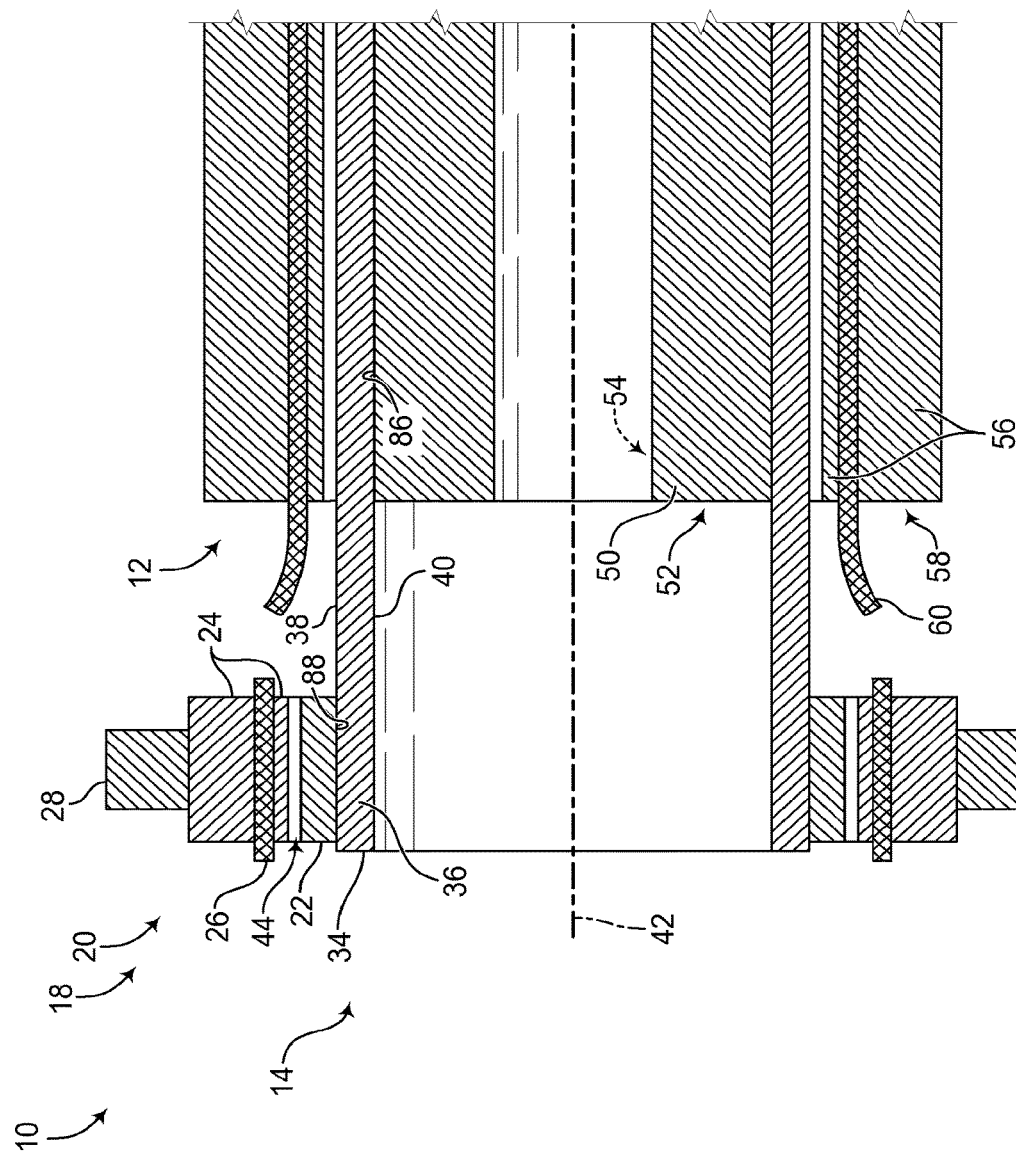
FIG. 1 is a longitudinal axial section partial view of a nonexclusive illustrative example of a rotating machine having a magnetic bearing and a rotor with a hollow fiber-reinforced composite shaft.

A nonexclusive illustrative example of a rotating machine in the form of an electrical machine is shown generally at 10 in FIG. 1. Unless otherwise specified, the electrical machine 10 and/or its various components and parts may, but are not required to, contain at least one of the structures, components, functionalities, and/or variations described, illustrated, and/or incorporated herein. Electrical machine 10 may be any suitable type of electrical machine, such as, without limitation, a cage rotor induction machine, a wound rotor induction machine, a wound rotor synchronous machine, a synchronous reluctance machine, a switched reluctance machine, a permanent magnet assisted synchronous reluctance machine, or a permanent magnet synchronous machine. In the illustrated example, the electrical machine 10 includes a stator 12, a nonexclusive illustrative example of an electrical machine rotor 14 that extends through the stator 12, and a bearing 18, which may be or include a magnetic bearing 20 that is configured to magnetically levitate or support the rotor 14 for rotation relative to the stator 12.

As shown in the nonexclusive illustrative example presented in FIG. 1, the magnetic bearing 20 may be or include an active magnetic bearing (AMB). In some examples, the magnetic bearing 20 may be or include a passive magnetic bearing.

The magnetic bearing 20 includes a magnetic bearing rotor core 22, a magnetic bearing stator core 24, magnetic bearing stator windings 26 and a magnetic bearing base or housing 28. As may be understood, the magnetic bearing housing 28 may be secured to, or secured relative to, any suitable structure, such as the stator, the ground or other support. With regard to the magnetic bearings illustrated herein, it should be understood that the particular structure shown is merely a conceptual nonexclusive illustrative example of a magnetic bearing. Accordingly, any suitable configuration of magnetic bearing may be used, with appropriately shaped and configured magnetic bearing rotor and stator cores 22, 24.

In some examples, the magnetic bearing rotor core 22 and/or the magnetic bearing stator core 24 may be fabricated from or otherwise include a soft magnetic composite (SMC) that includes a magnetic material powder and a suitable polymer binder, such as where the magnetic material powder is pressed, compacted and/or solidified within a suitable resin material. In some examples, the magnetic bearing rotor core 22 and/or the magnetic bearing stator core 24 may include a plurality of laminations, such as a plurality of laminated steel sheets. In some examples, the magnetic bearing rotor core 22 and/or the magnetic bearing stator core 24 may be fabricated from a suitable combination of a soft magnetic composite and a plurality of laminations.

The rotor 14 includes a hollow fiber-reinforced composite shaft 34 with the magnetic bearing rotor core 22 being disposed on the shaft 34. The shaft 34 may have a wall 36 that is defined by the exterior and interior surfaces 38, 40 of the shaft 34. In some examples, the wall 36 of the shaft 34 may have a wall thickness measured between its exterior and interior surfaces 38, 40 that is less than about ten percent (10%) of the outside diameter of the shaft, such as between about three percent (3%) and about six percent (6%) of the outside diameter of the shaft, or even less than about five percent (5%) of the outside diameter of the shaft.

Although illustrated in the context of an electrical machine, it is within the scope of the present disclosure for the rotor 14, with its hollow fiber-reinforced composite shaft 34 and magnetic bearing rotor core 22, to be used in any suitable rotating machine having a magnetic bearing 20 configured to magnetically levitate the rotor.

The hollow fiber-reinforced composite shaft 34 may be nonmagnetic, fiber-reinforced, and/or fabricated at least partially or even substantially completely from a suitable composite material. For example, the shaft may be a fiber-reinforced composite shaft that is fabricated from a fiber-reinforced composite material that includes a plurality of suitable reinforcing fibers embedded in a suitable matrix. In some examples, the fiber-reinforced composite shaft 34 may have been fabricated substantially completely from a fiber-reinforced composite material that includes a suitable matrix material having suitable reinforcing fibers embedded therein. In some examples, a fiber-reinforced composite shaft may comprise a shaft fabricated from any suitable material, which may be nonmagnetic, with the shaft having been reinforced with one or more layers of suitable reinforcing fibers, which fibers may have been embedded in a suitable matrix material.

Nonexclusive illustrative examples of suitable fibers for the hollow fiber-reinforced composite shaft 34 include carbon, aramid (such as Kevlar®), glass, polyester, polyethylene (such as Spectra®), quartz, basalt, boron, aluminum and other types of fibers. A particular type of fiber, or combination of fiber types, may be selected such that the shaft 34 possesses or provides one or more desired material properties, such as high strength or high modulus, and/or a low coefficient of thermal expansion. In some examples, the shaft 34 may be fabricated using high modulus, or even ultrahigh modulus, carbon fibers, such as those having a modulus greater than about 350 GPa, greater than about 450 GPa or even greater than about 500 GPa.

Nonexclusive illustrative examples of suitable matrix materials for the fiber-reinforced composite of the shaft 34 include inorganic and organic polymers, including thermoplastic and thermosetting resins, such as epoxies and other cross-linking polymer resins. In some examples, one or more filler materials may be added to, or included in, the matrix material, such as to provide desired mechanical, thermal and/or electrical properties. For example, boron nitride or aluminum oxide particles may be added to, or included in, the matrix material.

In some examples, at least a portion of the shaft 34 may be fabricated by filament or tape winding a suitable filament or tape of fibers onto a suitable mandrel, which may be substantially cylindrical, to form the wall 36 of the shaft 34. The fibers of the filament or tape may be coated with resin during the winding process or the filament or tape may be in a "pre-preg" form, with fibers that are pre-impregnated with uncured or partially cured resin. In some examples, at least a portion of the shaft 34 may be fabricated by wrapping or laying-up sheets or plies of woven and/or unidirectional fibers, which may be in pre-preg form, onto the mandrel and/or onto previously filament or tape wound fibers, such as is described in International Application No. PCT/US2012/054183, the complete disclosure of which is incorporated by reference in its entirety for all purposes. As may be understood, the interior surface 40 of the shaft 34 may be formed by the exterior surface of the mandrel. The exterior surface 38 of the shaft 34 may retain its as-wound or as-wrapped surface finish and/or it may be processed to provide a predetermined degree of smoothness and/or roundness. For example, the exterior surface 38 of the shaft 34 may be turned or machined after curing the matrix material to provide a predetermined degree of smoothness and/or roundness. In some examples, the exterior surface may be provided with a finish having a predetermined degree of smoothness and/or roundness during a curing process, such as through use of a wrap applied to the tube for and/or during a curing process.

As may be understood, the mechanical properties of the shaft 34, when fabricated at least partially from a fiber-reinforced composite material, may be selected, tuned or adjusted by using suitable combinations of fiber orientations. In particular, inclusion of fibers that are more closely parallel to an axis 42 of the shaft 34, or are substantially axially aligned, may provide or improve lateral stiffness or bending resistance, inclusion of fibers that are obliquely oriented, helical or skew relative to the axis of the shaft 34, or off-axis, may provide or improve torsional stiffness, while inclusion of fibers that are more closely circumferentially oriented or transverse relative to the axis of the shaft 34 may provide or improve the shaft's hoop strength or resistance to lateral compression or buckling. By way of a nonexclusive illustrative example, fibers may be considered to be: substantially axially aligned when the fibers are oriented at an angle of less than about plus or minus ten degrees (±10°) relative to a line parallel to the axis of the shaft 34, obliquely oriented, helical or skew when the fibers are oriented at an angle of between about plus or minus ten degrees (±10°) and about plus or minus eighty degrees (±80°) relative to a line parallel to the axis of the shaft 34, and circumferentially oriented or transverse when the fibers are oriented at an angle of between about plus or minus eighty degrees (±80°) and about ninety degrees (90°) relative to a line parallel to the axis of the shaft 34. In some nonexclusive illustrative examples, the shaft 34 may include a suitable combination of: fibers that are substantially axially-aligned or at approximately zero degrees (0°) relative to a line parallel to the axis of the shaft, fibers that are oriented or wrapped at an angle of about plus or minus forty-five degrees (±45°) relative to a line parallel to the axis of the shaft, and/or fibers that are oriented or wrapped at an angle of about ninety degrees (90°) relative to a line parallel to the axis of the shaft.

As may be understood, a solid metal shaft for a machine having a particular torque and/or power rating may be replaced with a larger diameter hollow shaft because the larger diameter hollow shaft may provide similar or even increased strength and/or stiffness. However, forging and/or machining a hollow, increased diameter shaft may add substantial additional expense to the cost for a metal shaft. In contrast, fabricating an increased diameter hollow shaft at least partially or even completely from a fiber-reinforced composite material may provide a cost effective approach to increasing shaft diameter, strength and/or stiffness and/or reducing shaft and rotor weight.

When compared to a forged and/or machined metal shaft, a shaft that is at least partially fabricated from a fiber-reinforced composite material may have a reduced weight, an increased diameter, and/or a similar or even increased stiffness.

In particular, fabricating a hollow shaft from a fiber-reinforced composite material may allow for a shaft with an increased diameter for a particular machine size as compared to the diameter of a solid metal shaft for the same machine, which may result in a shaft of similar or even reduced weight, but with comparable or greater, or even much greater, stiffness and/or strength, as compared to the solid metal shaft. As a nonexclusive illustrative example, a hollow fiber-reinforced composite shaft may permit a shaft diameter that is two or more times the diameter of a solid metal shaft for a machine of a particular torque and/or power rating, with smaller or lower rated machines being amenable to even larger increases in shaft diameter. As may be understood, reducing shaft weight or mass, along with the attendant reduction in rotor weight or mass, may allow reductions in bearing size, rating, weight, loading and/or losses, which may result in improved bearing lifespan and/or reduced costs.

As shown in the nonexclusive illustrative example presented in FIG. 1, the magnetic bearing rotor core 22 may be disposed on and around the exterior surface 38 of the shaft 34, which may be referred to as an outer-bearing configuration. In such a configuration, increasing the diameter of the shaft 34 may result in a corresponding increase in the diameter of the magnetic bearing air gap 44.

In contrast to bearings that involve physical contact between bearing surfaces (e.g., plain or friction bearings and rolling-element bearings such as ball bearings and roller bearings), which are adversely affected by increased shaft diameters due to the corresponding higher surface speeds, magnetic bearings, which may be active or passive magnetic bearings and which may provide electromagnetic or electrodynamic suspension, benefit from increased shaft diameters. In particular, increasing the shaft diameter for a magnetic bearing results in an increased surface area available for magnetic flux, which may increase the load capability of the bearing per unit axial bearing length. Thus, the increased bearing air gap diameter for a magnetic bearing that results from an increased shaft diameter may allow for an increased load rating or capacity and/or a reduction in axial length for the magnetic bearing, which may permit use of magnetic bearings in relatively larger machines without needing an impractically long rotor and/or magnetic bearing.

In addition, increasing the shaft and/or rotor diameter for an electrical machine may allow for an increased air gap radius or diameter for the electrical machine, which may result in increased electrical machine performance in the form of higher torque, higher speed, lower frequency, higher power, higher power at a given torque, and/or axial machine length reduction for a given electrical machine torque and/or power rating, any of which may result in reduced cost and/or weight for the electrical machine.

As shown in the nonexclusive illustrative example presented in FIG. 1, the rotor 14 includes a rotor active portion 50 for the electrical machine 10. The rotor active portion 50 is disposed within the hollow fiber-reinforced composite shaft 34 and extends along the axis 42 to a rotor active portion end 52. In some examples, the rotor active portion 50 may include a plurality of rotor laminations 54, which may include a plurality of laminated steel sheets, that are disposed within the shaft 34 and extend at least partially around the interior surface of the shaft. The plurality of rotor laminations 54 may be arranged or stacked along the axis 42, with the rotor active portion end 52 substantially corresponding to an end of the rotor laminations. In some examples, the rotor active portion 50 may be fabricated from or include a soft magnetic composite that is disposed within the shaft 34 and extends at least partially around the interior surface of the shaft. In some examples, the rotor active portion 50 may be fabricated from or include a suitable combination of a soft magnetic composite and a plurality of rotor laminations. In some examples, the rotor active portion may include rotor windings.

As shown in the nonexclusive illustrative example presented in FIG. 1, the stator 12 includes a stator active portion 56 that extends along the axis 42 to a stator active portion end 58 that may be substantially axially aligned with the rotor active portion end 52. As shown in FIG. 1, stator end windings 60 may extend from the stator active portion end 58. Accordingly, the magnetic bearing 20 of the electrical machine 10 may be axially spaced from the rotor and stator active portion ends 52, 58 so as to provide physical clearance for the stator end windings 60 and/or to reduce losses on the magnetic bearing stator core 24 and/or the magnetic bearing stator windings 26.

Figure 2:
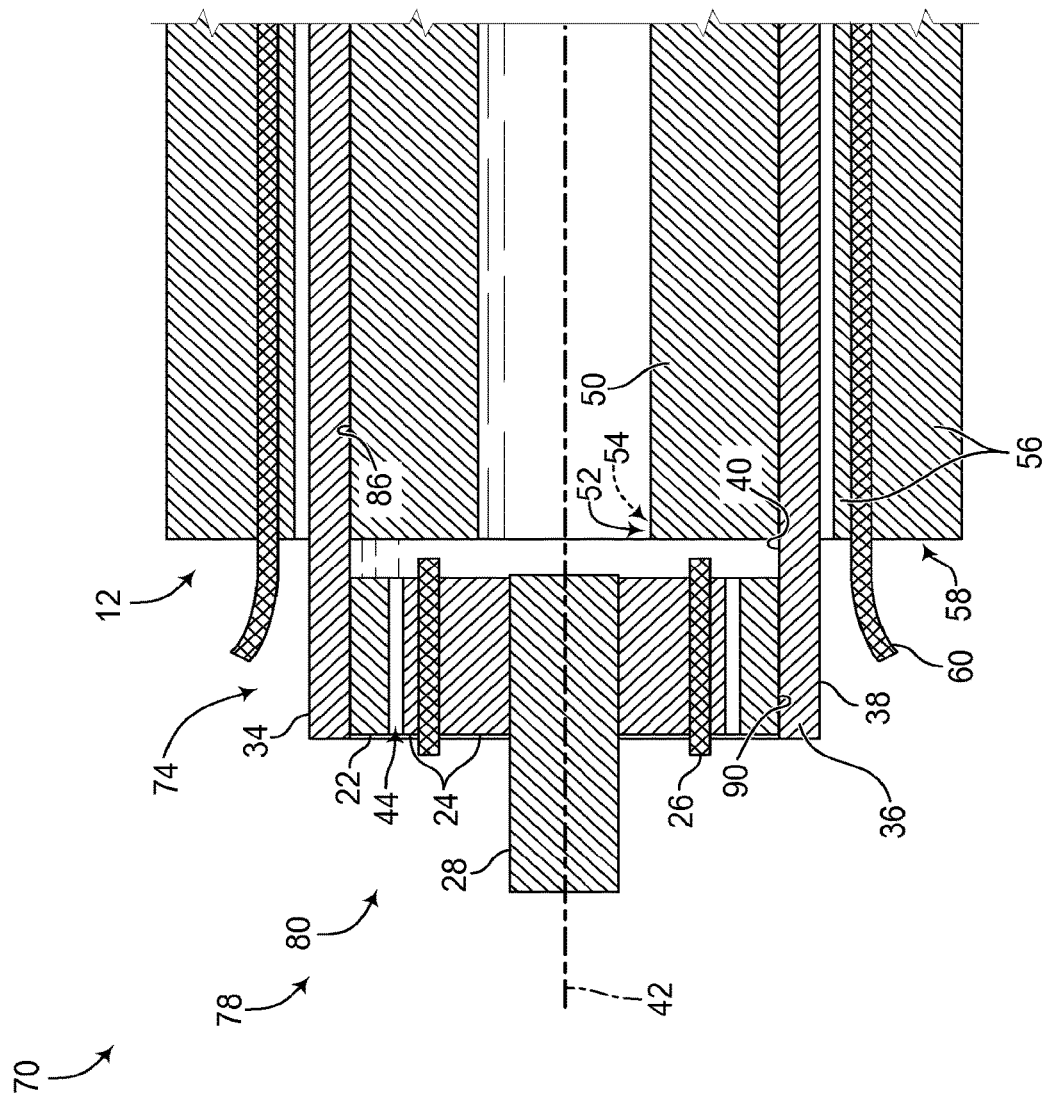
FIG. 2 is a longitudinal axial section partial view of another nonexclusive illustrative example of a rotating machine having a magnetic bearing and a rotor with a hollow fiber-reinforced composite shaft.

Another nonexclusive illustrative example of a rotating machine in the form of an electrical machine is shown generally at 70 in FIG. 2. Unless otherwise specified, the electrical machine 70 and/or its various components and parts may, but are not required to, contain at least one of the structures, components, functionalities, and/or variations described, illustrated, and/or incorporated herein. Electrical machine 70 may be any suitable type of electrical machine, such as, without limitation, a cage rotor induction machine, a wound rotor induction machine, a wound rotor synchronous machine, a synchronous reluctance machine, a switched reluctance machine, a permanent magnet assisted synchronous reluctance machine, or a permanent magnet synchronous machine. In the illustrated example, the electrical machine 70 includes a stator 12, a nonexclusive illustrative example of an electrical machine rotor 74 that extends through the stator 12, and a bearing 78, which may be or include a magnetic bearing 80 that is configured to magnetically levitate or support the rotor 74 for rotation relative to the stator 12.

As shown in the nonexclusive illustrative example presented in FIG. 2, the magnetic bearing 80 may be or include an active magnetic bearing. In some examples, the magnetic bearing 80 may be or include a passive magnetic bearing.

The magnetic bearing rotor core 22 of the illustrated magnetic bearing 80 may be disposed on and around the interior surface 40 of the hollow fiber-reinforced composite shaft 34, which may be referred to as an inner-bearing configuration. As may be seen in FIG. 2, the inner-bearing configuration may permit an axially shorter or more compact rotor and/or machine configuration. For example, when the magnetic bearing rotor core 22 is disposed within the shaft 34, the magnetic bearing rotor core may be disposed proximate and/or relatively close to the rotor active portion end 52, such as proximate the rotor laminations 54 or soft magnetic composite at the rotor active portion end 52, which may permit a reduction of overall rotor and/or machine length. Furthermore, placement of the magnetic bearing 80 within the shaft 34 may allow for at least a portion of the magnetic bearing rotor core 22 to be substantially axially aligned with the stator end windings 60, which may also permit a reduction of overall rotor and/or machine length.

Furthermore, the radial spacing between the inner-bearing configuration magnetic bearing 80 and the stator end windings 60 may reduce or avoid losses on the magnetic bearing stator that may otherwise result from stray fields from the stator end windings 60.

Although illustrated in the context of an electrical machine, it is within the scope of the present disclosure for the rotor 74, with its hollow fiber-reinforced composite shaft 34 and magnetic bearing rotor core 22, to be used in any suitable rotating machine having a magnetic bearing 80 configured to magnetically levitate the rotor.

With regard to the electrical machines 10 and 70 illustrated in FIGS. 1 and 2, any suitable connection, joint and/or interface may be used to mount, secure or attach the magnetic bearing rotor core 22 and/or the rotor active portion 50 to the hollow fiber-reinforced composite shaft 34. As may be understood, a particular connection, joint and/or interface may be selected and/or configured so as to address various considerations, such as different coefficients of thermal expansion between the composite shaft and the magnetic bearing rotor core and/or the rotor active portion, as well as the strength and/or stiffness of the connection, joint and/or interface. In some examples, the magnetic bearing rotor core and/or the rotor active portion may be adhesively bonded to the interior and/or exterior surfaces of the hollow fiber-reinforced composite shaft.

In some examples, a mechanical interlock and/or engagement may be provided between the magnetic bearing rotor core and the shaft and/or between the rotor active portion and the shaft. For example, the interior surface 40 of the shaft 34 of the rotors 14 and 74 illustrated in FIGS. 1 and 2 may be faceted, keyed or splined so as to mechanically engage corresponding facets, keys or splines on the outer-diameter surface 86 of the rotor active portion 50. The exterior surface 38 of the shaft 34 of the rotor 14 shown in FIG. 1 may be faceted, keyed or splined so as to mechanically engage corresponding facets, keys or splines on the inner-diameter surface 88 of the rotor core of the magnetic bearing 20. The interior surface 40 of the shaft 34 of the rotor 74 shown in FIG. 2 may be faceted, keyed or splined so as to mechanically engage corresponding facets, keys or splines on the outer-diameter surface 90 of the rotor core of the magnetic bearing 80.

When the interior and/or exterior surfaces of the fiber-reinforced composite shaft 34 are splined, the resulting plurality of splines on the interior and/or exterior surfaces may be fabricated or formed using any suitable method. For example, the splines may be machined or broached after the shaft has been fabricated. In some examples, the splines may be formed during the layup process, using suitably oriented fibers. For example, prior to filament or tape winding helically and/or circumferentially oriented fibers onto a mandrel to from the shaft, axially oriented fibers may be placed into axially aligned slots or channels on the exterior surface of the mandrel to form splines on the interior surface of the shaft, with the splines comprising axially oriented fibers.

As used herein the term "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a," "a first" or "the" element, or the equivalent thereof, should be understood to include incorporation of one or more such elements, neither requiring nor excluding two or more such elements, unless the context clearly indicates otherwise. As used herein, the terms "having", "containing", "including", "comprising" and the like are open ended terms that indicate the presence of stated elements or features, but do not preclude additional elements or features.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A rotor for a rotating machine having a magnetic bearing configured to magnetically levitate the rotor, the rotor comprising:
    a hollow fiber-reinforced composite shaft;
    a magnetic bearing rotor core disposed on the shaft and configured for use with the magnetic bearing; and
    a rotor active portion disposed within the shaft that extends around an interior surface of the shaft, and the rotor active portion including a plurality of rotor laminations arranged along an axis of the rotor.

2. The rotor of claim 1, wherein the hollow fiber-reinforced composite shaft has a diameter and a wall thickness, and the wall thickness is less than about 10% percent of the diameter.

3. The rotor of claim 1, wherein the magnetic bearing rotor core is disposed on the interior surface of the shaft.

4. The rotor of claim 1, wherein the magnetic bearing rotor core is disposed on the interior surface of the shaft proximate an end of the rotor active portion.

5. The rotor of claim 1, wherein the plurality of laminated steel sheets are stacked along the axis of the rotor.

6. The rotor of claim 1, wherein the rotor active portion includes rotor windings.

7. The rotor of claim 1, wherein the hollow fiber-reinforced composite shaft has a diameter and a wall thickness, and the wall thickness is between 3% and 6% of the diameter.

8. The rotor of claim 1, wherein the hollow fiber-reinforced composite shaft has a diameter and a wall thickness, and the wall thickness is less than 5% of the diameter.

9. The rotor of claim 1, wherein the hollow fiber-reinforced composite shaft is fabricated from a fiber-reinforced composite material that includes a plurality of reinforcing fibers embedded in a matrix.

10. The rotor of claim 1, wherein the plurality of rotor laminations includes a plurality of laminated steel sheets arranged along the axis of the rotor.

11. An electrical machine rotor, comprising:
    a hollow fiber-reinforced composite shaft having an interior surface;

a rotor active portion disposed within the shaft and extending around the interior surface; and a magnetic bearing rotor core disposed on the shaft and configured for use with a magnetic bearing, wherein the hollow fiber-reinforced composite shaft comprises an exterior surface and a plurality of splines on at least one of the interior and exterior surfaces, the splines are configured to engage at least one of the rotor active portion and the magnetic bearing rotor core, and the splines comprise axially oriented fibers.

12. The electrical machine rotor of claim 11, wherein the hollow fiber-reinforced composite shaft has a diameter and a wall thickness, and the wall thickness is less than about 10% percent of the diameter.

13. The electrical machine rotor of claim 11, wherein the magnetic bearing rotor core is disposed on the interior surface of the shaft.

14. The electrical machine rotor of claim 11, wherein the magnetic bearing rotor core is disposed proximate an end of the rotor active portion.

15. The electrical machine rotor of claim 11, wherein at least one of the rotor active portion and the magnetic bearing rotor core comprises a soft magnetic composite.

16. The electrical machine rotor of claim 11, wherein the rotor active portion includes a plurality of rotor laminations having a plurality of laminated steel sheets arranged along an axis of the rotor.

17. The electrical machine rotor of claim 11, wherein the rotor active portion includes rotor windings.

18. The electrical machine rotor of claim 11, wherein the hollow fiber-reinforced composite shaft has a diameter and a wall thickness, and the wall thickness is between 3% and 6% of the diameter.

19. The electrical machine rotor of claim 11, wherein the hollow fiber-reinforced composite shaft has a diameter and a wall thickness, and the wall thickness is less than 5% of the diameter.

20. The electrical machine rotor of claim 11, wherein the hollow fiber-reinforced composite shaft is fabricated from a fiber-reinforced composite material that includes a plurality of reinforcing fibers embedded in a matrix.

* * * * *